US007582857B2

(12) United States Patent
Gruev et al.

(10) Patent No.: US 7,582,857 B2
(45) Date of Patent: Sep. 1, 2009

(54) SENSOR AND POLARIMETRIC FILTERS FOR REAL-TIME EXTRACTION OF POLARIMETRIC INFORMATION AT THE FOCAL PLANE

(75) Inventors: Viktor Gruev, Philadelphia, PA (US); Jan Van der Spiegel, Philadelphia, PA (US); Nader Engheta, Wayne, PA (US)

(73) Assignee: The Trustees of The University of Pennsylvania, Philadelphia, PA (US)

( * ) Notice: Subject to any disclaimer, the term of this patent is extended or adjusted under 35 U.S.C. 154(b) by 32 days.

(21) Appl. No.: 11/406,993

(22) Filed: Apr. 18, 2006

(65) Prior Publication Data

US 2007/0241267 A1 Oct. 18, 2007

(51) Int. Cl.
*G02F 1/01* (2006.01)
(52) U.S. Cl. ........................ 250/225; 356/364
(58) Field of Classification Search ............ 250/208.1, 250/216, 214.1, 214 R, 225; 359/483–490; 356/364–370
See application file for complete search history.

(56) References Cited

U.S. PATENT DOCUMENTS

| 4,564,545 | A | | 1/1986 | Okumura et al. |
| 5,327,285 | A | | 7/1994 | Faris .................. 359/483 |
| 5,416,324 | A | * | 5/1995 | Chun .................. 250/341.3 |
| 5,975,702 | A | | 11/1999 | Pugh, Jr. et al. ......... 351/246 |
| 6,816,261 | B2 | | 11/2004 | Patel et al. |
| 2003/0067602 | A1 | * | 4/2003 | Patel et al. ............... 356/369 |
| 2004/0155175 | A1 | * | 8/2004 | McNulty ................ 250/208.1 |
| 2005/0151926 | A1 | * | 7/2005 | Kumar et al. ............. 351/163 |
| 2006/0050273 | A1 | * | 3/2006 | Chinnock et al. ......... 356/364 |
| 2006/0119937 | A1 | * | 6/2006 | Perkins et al. ........... 359/486 |

OTHER PUBLICATIONS

Andreou, A. G. et al., "Polarization imaging: principles and integrated polarimeters," *IEEE Sensors Journal*, 2002, 2(6), 566-576.
Battey, J. F., "Design criteria for uniform reaction rates in an oxygen plasma," *IEEE Electron Devices*, 1977, 2, 140-146.
Cook, J. M. et al., "Application of EPR spectroscopy to oxidative removal of organic materials," *J. Electrochem. Soc.*, 1983, 130(12), 2459-2464.

(Continued)

*Primary Examiner*—Thanh X Luu
*Assistant Examiner*—Francis M Legasse, Jr.
(74) *Attorney, Agent, or Firm*—Woodcock Washburn LLP (57) ABSTRACT

A polarimetric imaging system employs a pixel pitch matched filter for use within, for example, a 2 by 2 pixel neighborhood, in which one pixel samples the scene via a 0 degree polarization filter and a second pixel samples the scene via a 45 degree polarization filter. The remaining two pixels record the intensity of the light within the 2 by 2 neighborhoods. The polarization filters employ organic materials such as polymers or metallic materials that are patterned and etched using reactive ion etching (RIE) or other appropriate etching technique in order to create 14 micron or smaller circular (or square) periodic structures that are patterned into polarization thin films that are deposited on an imaging sensor that includes a processor that computes from the polarization-filtered inputs the first three Stokes parameters in real-time.

15 Claims, 9 Drawing Sheets

OTHER PUBLICATIONS

Gruev, V. et al., "Implementation of Steerable Spatiotemporal Image Filters On The Focal Plane," *IEEE Trans. Circuits and Systems II: Analog and Digital Processing*, 2002, 49(4), 233-244.

Gruev, V. et al., "Linear current mode imager with low fix pattern noise," *ISCAS*, 2004, IV-860-IV-863.

Guo, J. et al., "Fabrication of high-resolution micropolarizer array," *Optical Engineering*, 1997, 36(8), 2268-2271.

Hughes, J. et al., "$S^3I$: the Seamless $S^2I$ Switched-Current cell," *ISCAS '97*, Jun. 1997, 113-116.

Ismail, A. M. et al., "Wideband CMOS current conveyer," *IEEE Electronics Letters*, 1998, 34(25), 2368-2369.

Labhart, T. "Polarization opponent interneurons in the insect visual system," *Nature*, 1988, 331, 435-437.

Land, M.F., et al., "Polarization sensitivity, Comparative physiology and evolution of vision in invertebrates" in *The Handbook of Sensory Physiology*, vol. VII/6B, edited by H. Autrum, Springer-Verlag, New York, 1981, 281-469.

Lythgoe, J. N. et al., "Polarized Light and Underwater Vision," *Nature*, 1967, 893-894.

Mendis, S. et al., "CMOS Active Pixel Image Sensors For Highly Integrated Imaging Systems," *IEEE J. Solid-State Circuits*, 1997, 32(2), 187-197.

Moon, U-K., "CMOS high-frequency switched-capacitor filters for telecommunication applications," *IEEE Journal of Solid-State Circuits*, 2000, 35(2), 212-220.

Rowe, M. P. et al., "Graded Index Model of a Fish Double Cone Exhibits Differential Polarization Sensitivity," in *Journal of Optical Society of America A*, 1994, 11(1), 55-70.

Schwartz, M., et al., "Single-Chip CMOS Image Sensors for a Retina Implant System," *IEEE Trans. Circuits and Systems II*, 1999, 46(7), 870-877.

Sodini, C. et al., "Integrated Memory/Logic Architecture For Image Processing," *Proc. 11th Int. Conf. VLSI Design, IEEE*, 1998, 304-309.

Tyo, J. S. et al., "Colorimetric Representations for Use with Polarization-Difference Imaging of Objects in Scattering Media," in *Journal of Optical Society of America A*, 1998, 15(2), 367-374.

Wolff, L. B. et al., "Liquid crystal polarization camera," in *Proceedings of the IEEE Workshop on Applications of Computer Vision*, 1992, 120-127.

Wolff, L. B. et al., "Liquid crystal polarization camera," *IEEE Transactions on Robotics and Automation*, 1997, 13(2), 195-203.

Wydeven, T. T. et al., "Plasma etching of Poly[$N,N$-($p,p,$'-oxydiphenylene$)$ pyromellitimide] film and photo/thermal degradation of etched and unetched film," *ACS Symposium Series*, American Chemical Society, Washington, D.C., 1979, 299-314.

MicroChem, Photoesists, Developers, Removers, & Optical Dyes, http://www.microchem.com, 2006, downloaded from the internet on Dec. 7, 2006, 1 page.

Edmund Optic Optics/Worldwide, 2003, http://www.edmundoptics.com, downloaded from the internet on Dec. 7, 2006, 1page.

* cited by examiner

Figure 7: Etching rate of PVA and SU-8 as a function of $CF_4$

Figure 8: Polarimetric filters made from PVA molecules

FIGURE 9

SENSOR AND POLARIMETRIC FILTERS FOR REAL-TIME EXTRACTION OF POLARIMETRIC INFORMATION AT THE FOCAL PLANE

GOVERNMENT INTEREST

Development of the present invention was supported in part by the U.S. Air Force Office of Scientific Research (AFOSR) under grant number FA9550-05-1-0052. The government may have certain rights in the invention.

FIELD OF THE INVENTION

The present invention relates to imaging using the polarization properties of light and, more particularly, to a sensor and polarimetric filters for use in extracting polarimetric information at the focal plane in real-time, and a method of making such sensors and filters.

BACKGROUND OF THE INVENTION

Polarization vision contains important information about the imaged environment, such as surface shapes, curvature and material properties, which are ignored with traditional imaging systems. Several species of invertebrate, such as cuttlefish, honeybees, desert ants, and others, rely on contrast enhancement using polarized vision, which is a vital survival mechanism in optically scattering media. The unaided human eye perceives visual information in terms of color and brightness, but it cannot effectively sense and utilize polarization. Accordingly, it is desired to develop an imaging system capable of extracting polarization information from the imaged environment in real-time and presenting the polarization information in parallel with the intensity information. The sensory system of the invention integrates imaging, a micro-polarization array and polarization processing at the focal plane to provide such an imaging system.

A survey of the literature reveals that most polarization sensitive imaging systems compute contrast enhancement information. This information is extracted by either temporally sampling two images filtered with two orthogonal polarized filters or integrating two orthogonal polarized filters over two neighboring photo elements. The contrast extraction information is computed either on a DSP/CPU or at the focal plane with translinear circuits. Usual tradeoffs in these systems are reduction of frame rate versus reduction of the spatial resolution in the latter systems. Incorporating pixel pitch matched polarization filters at the focal plane has been achieved using birefringence materials or thin film polarizers. Although these sensory systems are directly inspired from biological systems, they present limited polarization information in scattered media, such as fog, under water imaging and others. In contrast, complete polarization information tends to be far more complex and its computational demands prevent real-time extraction. These complex polarization properties are fully described by the fundamental parameters known as the Stokes parameters. As will be explained in more detail herein, in order to fully determine the Stokes parameters of natural (polychromatic) light, the scene must be sampled with three different polarization filters.

A micro-polarization array with two spatially distributed polarizers has been fabricated and described by Guo et al. as described in an article entitled "Fabrication of high-resolution micropolarizer array," Optical. Engineering, Vol. 36, No. 8, pp. 2268-2271 (1997). Manipulation of polymer polarization filters in order to create a micro-polarizer array has been described by Faris in U.S. Pat. No. 5,327,285. As will be appreciated by those skilled in the art, one of the main challenges in manipulating a relatively thick polymer polarizing filter is the patterning and etching of the structures within 1 μm accuracy. The thickness of commercially available polymer polarization thin films varies between 10 μm to 20 μm, which creates problems when standard etching techniques employed in the semiconductor industry are used to create micro structures on the order of 10 μm or less.

Traditional imaging systems focus on converting light's intensity and color property into suitable electronic signals. An important property of light, polarization is ignored with these traditional imaging systems. Polarization vision contains information about the imaged environment, such as surface shapes, curvature and material properties. Real-time extraction of polarization properties would further allow synergy with traditional adaptive spatiotemporal image processing techniques for synthetic imaging. However, to date, no camera has enabled computation of the Stokes parameters in real-time using a single camera, for conventionally at least three cameras are needed, each with a different polarization filter, or a single camera sequentially computes the Stokes parameters by sequentially imaging with different filters. The present invention has been designed to provide for such real-time extraction using a specially designed polarimetric sensor including a two layer micro-polarizer array in combination with a photo pixel array, noise suppression circuitry and on-chip processing circuitry for polarimetric computation of the Stokes parameters of a partially polarized (polychromatic) light in real-time.

SUMMARY OF THE INVENTION

An image sensor has been developed with real-time polarimetric extraction capability at the focal plane using low power analog circuits. The imaging system using such sensors is capable of computing the first three Stokes parameters (or two polarization parameters plus intensity) at the focal plane in real-time. In order to fully describe the polarization state of polychromatic light in nature, three linear polarized projections or two linear polarized projections in combination with the total intensity are required. Since the natural lights are mostly polychromatic, the phase information between the various components is usually not available (or statistically random or lost). Therefore, of the usual four Stokes parameters, the first three are more important and relevant for natural polychromatic lights. That is why only the first three Stokes parameters are addressed.

A two layer micro polarizer array with total thickness of around 20 μm has been fabricated and mounted on top of the imaging sensor. The image sensor comprises a 256 by 256 photo pixel array, noise suppression circuitry and analog or digital processing circuitry for polarimetric computation in the current or voltage domain. The image sensor was fabricated in 0.18 μm process with 10 μm pixel pitch and 75% fill factor. Block-parallel pixel read out is employed in order to compute the first three Stokes parameters on a neighborhood of 2 by 2 pixels. The Stokes parameters are presented together with the noise suppressed intensity image.

BRIEF DESCRIPTION OF THE DRAWINGS

These and other features, aspects, and advantages of the invention will become better understood in connection with the appended claims and the following description and drawings of various embodiments of the invention where:

FIGS. 6(*a*)-6(*p*) illustrate the micro-fabrication steps for creating polarization structures of the polarization filters of the invention.

FIGS. 9(*a*)-9(*i*) illustrate the steps involved in the creation of a wire-grid micropolarizer array.

DETAILED DESCRIPTION OF ILLUSTRATIVE EMBODIMENTS

The present invention may be understood more readily by reference to the following detailed description of illustrative and preferred embodiments taken in connection with the accompanying FIGS. 1-9 that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Where range of values is expressed, another embodiment includes from the one particular value and/or to the other particular value. Similarly, when values are expressed as approximations, by use of the antecedent "about it will be understood that the particular value forms another embodiment. All ranges are inclusive and combinable.

Overview of Polarization and Stokes Parameters

Polarization is a phenomenon observed in transverse waves. These are waves that vibrate in a direction perpendicular to their direction of propagation. Since light is a transverse wave, it can be represented as a sum of waves vibrating in (generally partially) random directions perpendicular to the line of propagation. If the vibration is consistently in a particular direction, the light is linearly polarized. Partial polarization of light usually occurs once the unpolarized light is reflected from a given surface or it has passed through a polarization filter.

The electric-field vector of a light wave traveling in the z direction can be represented as a composition of the electric-field vectors oscillating in the x-y plane.

$$E = E_x + E_y = \hat{x} E_x \cos(\psi + \phi_x) + \hat{y} E_y \cos(\psi + \phi_y) \quad (1)$$

In equation (1), $\hat{x}$ and $\hat{y}$ are unit vectors along the x and y axes, $\psi = \omega t$ with $\omega$ being the radian frequency, $\phi_x$ and $\phi_y$ are the phases, while $E_x$ and $E_y$ are the magnitude of the electric-field in the x and y directions, respectively. For a monochromatic case, depending on the relative difference between the phase $\phi_x$ and $\phi_y$, the transverse wave can be elliptically polarized if $\phi_x - \phi_y =$ constant, circularly polarized if $\phi_x - \phi_y = \pi/2$ or linearly polarized if $\phi_x - \phi_y = 0$.

The Stokes parameters presented by equations (2) through (5) below describe fully the polarization state of the electric-field vector E:

$$S_0 = \langle E_x^2 \rangle + \langle E_y^2 \rangle \quad (2)$$

$$S_1 = \langle E_x^2 \rangle - \langle E_y^2 \rangle \quad (3)$$

$$S_2 = 2 \langle E_x E_y \cos(\phi_x - \phi_y) \rangle \quad (4)$$

$$S_3 = 2 \langle E_x E_y \sin(\phi_x - \phi_y) \rangle \quad (5)$$

These equations are the traditional representation of the Stokes parameters. Following the Stokes equations, the polarization state can also be described if the following three quantities are known: $E_x$, $E_y$, and $\phi_x - \phi_y$. After some simple algebraic manipulations one can write:

$$S_0 = I_t \quad (6)$$

$$S_1 = 2I(0°, 0) - I_t \quad (7)$$

$$S_2 = 2I(45°, 0) - I_t \quad (8)$$

$$S_3 = I_t - 2I(45°, \pi/2) \quad (9)$$

where $I_t$ is the total intensity; $I(0°, 0)$ is the intensity of the e-vector filtered with a 0 degree polarizer and no phase compensation between the x and y components; $I(45°, 0)$ is the intensity of the e-vector filtered with a 45 degree polarizer and no phase compensation as above; and $I(45°, \pi/2)$ is the intensity of the e-vector filtered with a 45 degree polarizer and $\pi/2$ phase compensator between the x and y components. The first three Stokes parameters $S_0$, $S_1$, and $S_2$ fully describe the polarization of light with two linearly polarized intensities and the total intensity of the e-field vector. The fourth parameter describes the excess of right-circularly polarized component over the left-circularly polarized portion, which is less common in man-made and natural wave sources and it is not of interest in the present application. It is important to point out that for a partially polarized polychromatic light in nature, the measurement of the fourth Stokes parameter is not essential, since in these scenarios the phase between the two orthogonal components of polarization is usually statistically random. Therefore, for natural scenes, the first three Stokes parameters are usually of more interest, and thus only 3 independent measurements are needed in order to find the first three Stokes parameters.

Thus, in order to describe the polarization state of light in nature, three linear polarized projections or two linear polarized projections in combination with the total intensity are needed. The latter method is preferred for focal plane implementation since it only requires two thin film polarizers rotated by 45 degrees, patterned and placed adjacent to each other. The total thickness of the two-layer micro polarizer array can be around 20 µm, if a commercially available thin film polarizer is used.

Imaging Sensor and Micro-Polarizer Array Architectural Overview

Figure 1:
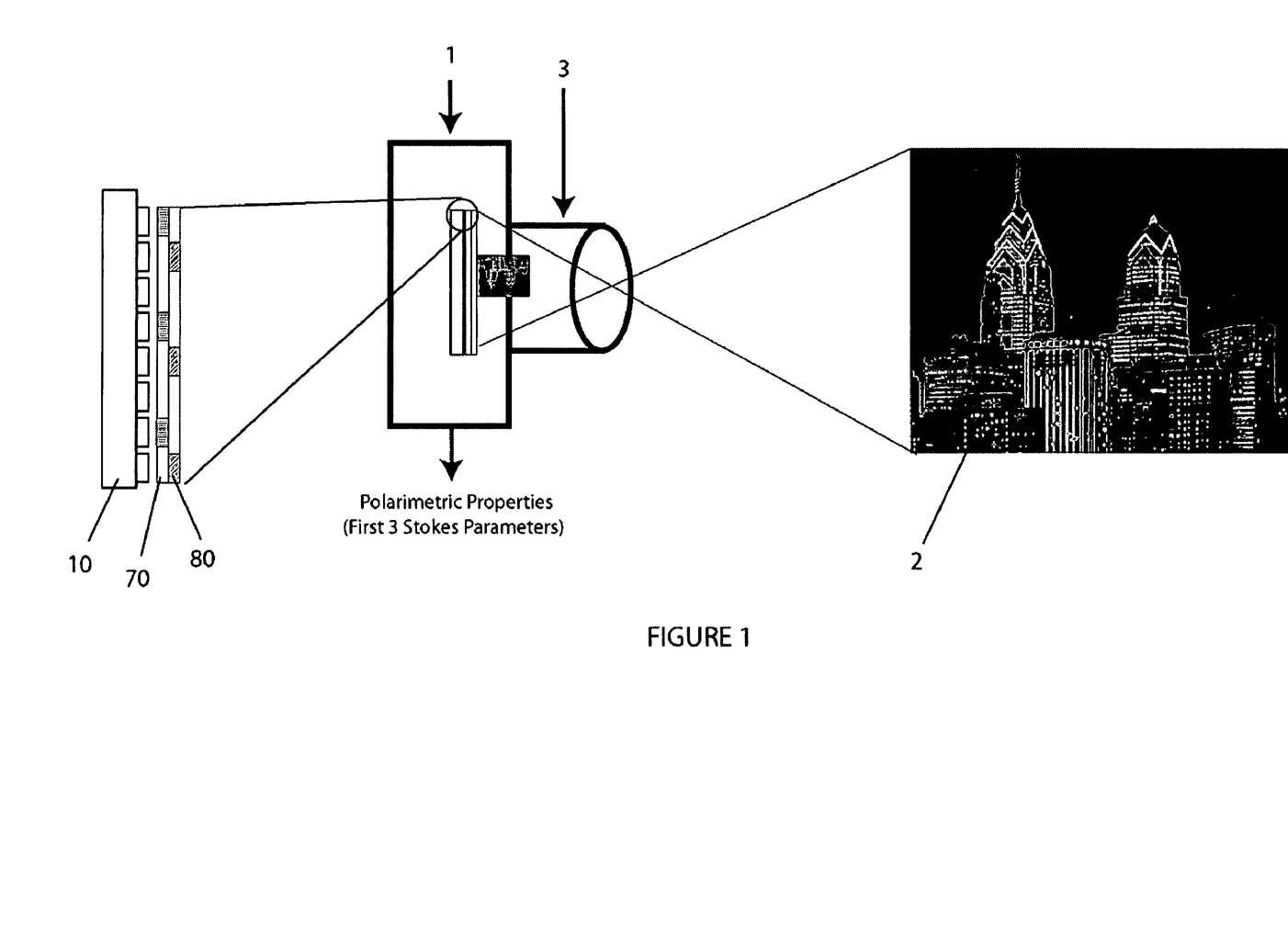
FIG. 1 illustrates a camera modified to include the polarimetric filters and sensor in accordance with the invention.

FIG. 1 illustrates a polarimetric camera 1 modified to include the polarimetric filters and sensor in accordance with the invention. As illustrated in FIG. 1, polarimetric camera 1 images a scene 2 via lens 3 and the polarization and intensity information of the image 2 impinges upon the imaging sensor 10 (CMOS or CCD) via a pair of polarization filters as described in more detail below. As shown, the polarization filters 70 and 80 have different polarization directions and are arranged such that the respective filters 70 and 80 cover different pixels of the imaging array of the image sensor 10. Also, in the case where a third polarization filter is not used, some pixels of the imaging array of the image sensor 10 are not covered by a polarization filter, thus facilitating collection of intensity information representative of image 2. In an exemplary embodiment, the image sensor 10 is disposed on a silicon chip within the polarimetric camera 1 and the polarization filters 70 and 80 are disposed adjacent to or over the respective pixels of the image sensor 10.

Figure 2:
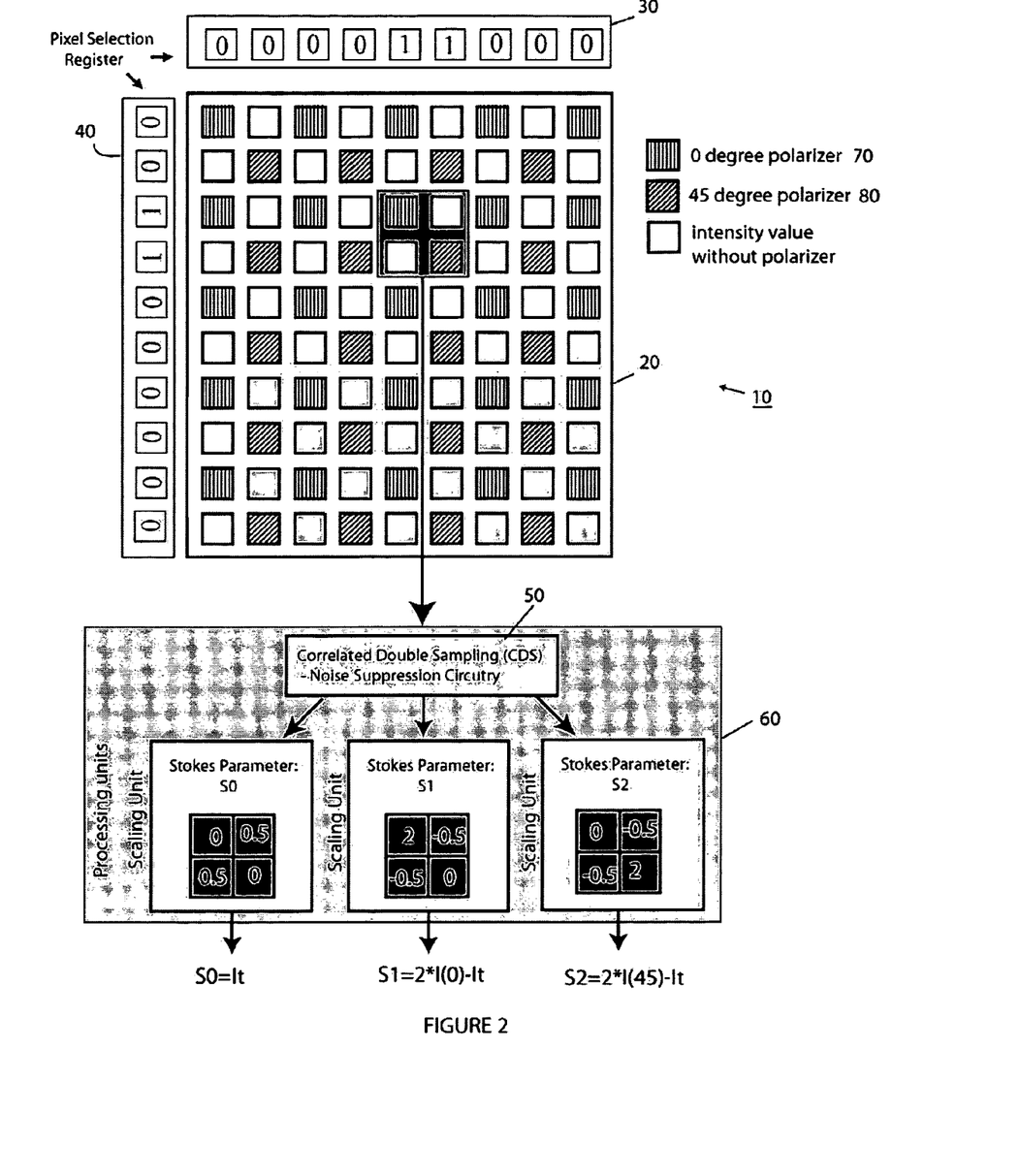
FIG. 2 illustrates an overview of the complete polarimetric imaging system of the invention.

An overview of the complete polarimetric imaging system of the invention is illustrated in FIG. 2. The imaging sensor 10 consists of a 256 by 256 photo pixels array of CMOS elements 20, reset and addressing registers 30, 40 for selecting pixels in both horizontal and vertical directions, a correlated double sampling unit 50 and a digitally controlled analog processing unit 60 that includes circuitry for computing the Stokes parameters in accordance with the techniques of the invention. Of course, the processing unit 60 also may be a digital processing unit if so desired. Also, the pixel elements 20 may be voltage mode active pixel sensors or current mode active pixel sensors (APS). Two thin film polarizers 70, 80 are individually patterned and deposited on top of the imaging array 20 in order to form the pattern illustrated in FIG. 2. The thin film patterns and the photo pixel architecture allow for block parallel access of 2 by 2 pixels neighborhood. The polarization state of the pixel neighborhood is computed by scaling individual pixels according to the first three Stokes equations (6) though (8) as illustrated in FIG. 2.

As noted above, image processing at the focal plane can be implemented in the analog or digital domain. In the analog domain, these circuits can be implemented in the current mode as described by V. Gruev and R. Etienne-Cummings in "Implementation of Steerable Spatiotemporal Image Filters On The Focal Plane," IEEE Trans. Circuits and Systems II: Analog and Digital Signal Processing, Vol. 49, No. 4, pp. 233-244, April 2002, or in the voltage domain by using switch capacitors circuits as described by Un-Ku Moon in "CMOS high-frequency switched-capacitor filters for telecommunication applications" IEEE Journal of Solid-State Circuits, Vol. 35, No. 2, pp. 212-220, February 2000. Both of these approaches have been extensively covered in the literature where more details on the advantages and disadvantages of each method can be found. Including an analog-to-digital converter (ADC) and a digital processing unit at the focal plane is another avenue of research in the system on a chip research community. In these architectures, multi-chip systems or a complicated digital system-on-chip are needed. Typically, the imaging and ADC is performed on one chip, while the computation is performed in the digital domain on a second chip as described by S. Mendis et al. in "CMOS Active Pixel Image Sensors For Highly Integrated Imaging Systems," IEEE J. Solid-State Circuits, Vol. 32, No. 2, p 187-197, 1997, and by C. Sodini, J. Gealow, Z. Talib, and I. Masaki in "Integrated Memory/Logic Architecture For Image Processing," Proc. 11th Int. Conf. VLSI Design, pp. 304-309, 1998. High power consumption, complex inter-chip interconnections and poor scalability are the usual limitations. A single chip solution has been discussed by M. Schwarz et al. in "Single-Chip CMOS Image Sensors for a Retina Implant System," IEEE Trans. Circuits and Systems II, Vol. 46, No. 7, pp 870-877, 1999, where the imaging, ADC and digital processing are included at the focal plane; however, a very small percentage of the chip is used for imaging.

Figure 3:
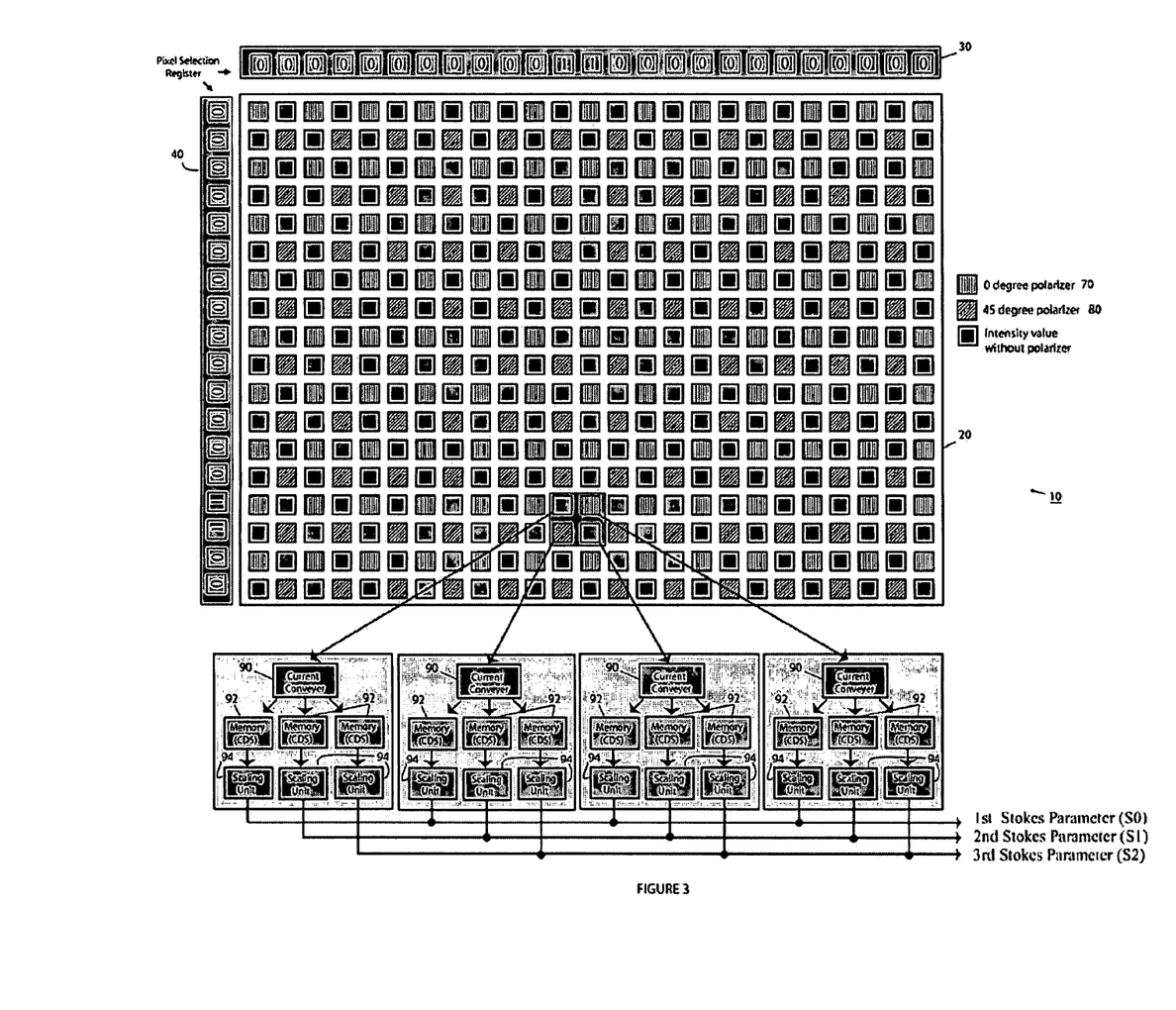
FIG. 3 illustrates an embodiment of the portion of the processing unit for a 2 by 2 pixel array illustrated in FIG. 2.

FIG. 3 illustrates an embodiment of the portion of the processing unit for a 2 by 2 pixel array illustrated in FIG. 2. As illustrated in FIG. 3, four parallel analog processors are used to provide block-parallel pixel read out in order to compute the first three Stokes parameters on a neighborhood of 2 by 2 pixels. For this purpose, a current conveyor 90 receives the output of the pixel and provides the output to three respective current memory cells 92, one for each Stokes parameter. The outputs of the respective current memory cells are provided to respective scaling units 94, where the outputs are scaled and summed so as to obtain the Stokes parameters. As illustrated in FIG. 3, the elements 90, 92, and 94 are replicated for each pixel in the 2×2 array so that processing may be conducted in parallel, thus facilitating real-time processing. In an exemplary embodiment, the four parallel analog processors are employed on a single chip using digitally programmable analog circuitry. After processing of the sensor outputs, the Stokes parameters are presented together with the noise suppressed intensity image.

Figure 4:
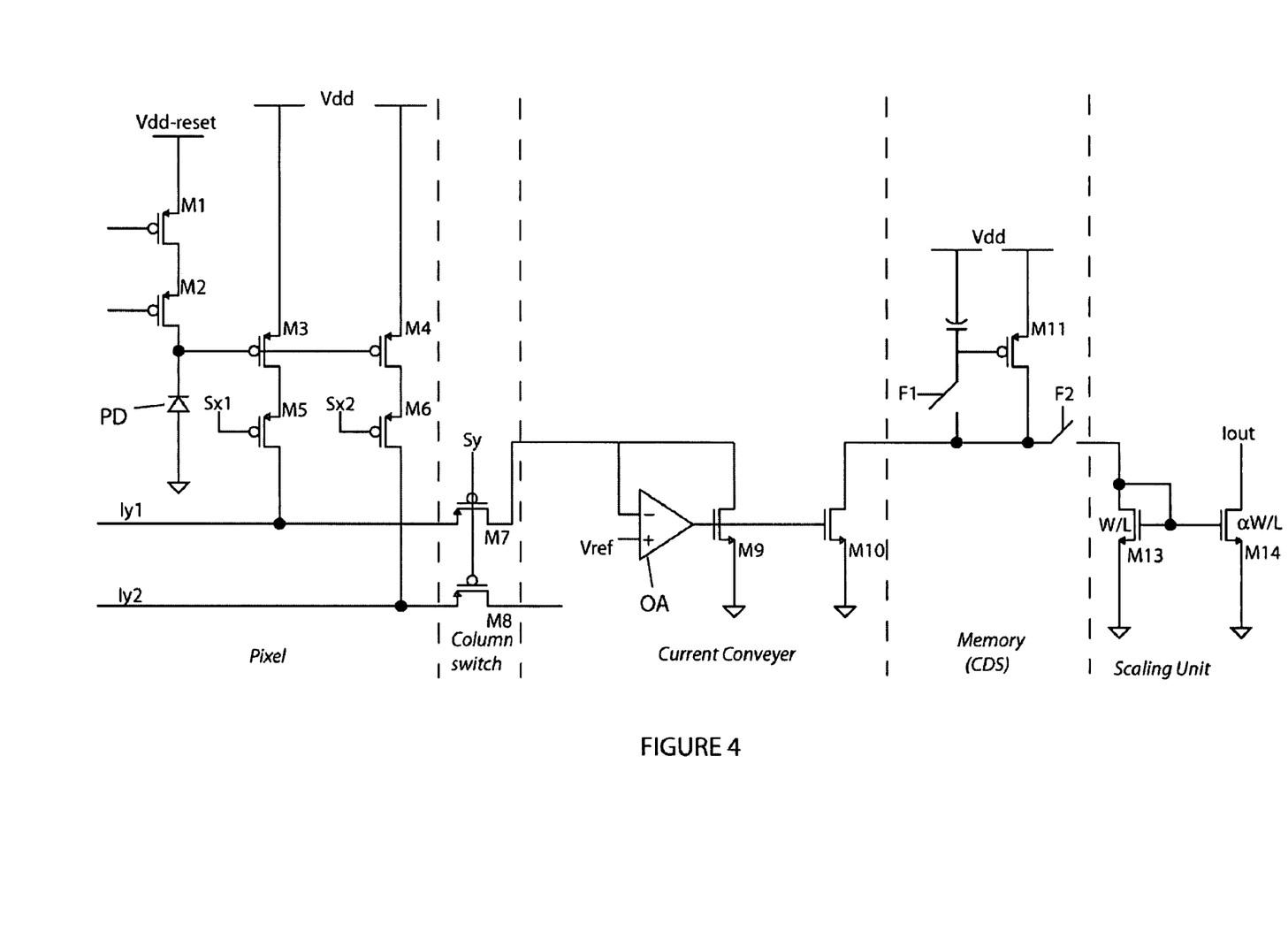
FIG. 4 illustrates an exemplary embodiment of the pixel, current conveyor, and current memory cell that together make up the correlated double sampling (CDS) and noise suppression circuitry and the scaling unit that is used in connection with the calculated Stokes parameters to scale the filtered outputs of the imaging circuitry illustrated in FIG. 2.

As illustrated in FIG. 4, each photo pixel in the image array of the imaging unit 10 is composed of transistors M1 through M6. Transistors M1 and M2 control the operational mode of the photodiode PD. These two transistors allow individual pixels to be reset sequentially. Hence, a single noise correction circuitry is used for the entire array and it bypasses the column fixed pattern noise problems which are associated with column parallel read out. Transistors M3 and M4 operate as linear transconductance amplifiers and they linearly convert the integrated voltage on the photodiode PD into two output currents. The output photo currents are presented on two separate column busses, labeled $I_y1$ and $I_y2$, which are individually addressed via transistors M5 and M6.

The linear photo current conversion is achieved by pinning the drain voltage of transistors M3 and M4 to $V_{dd}-\Delta$ voltage, while the reset voltage Vdd_reset is fixed to $V_{dd}-\Delta-V_{th}$. Therefore, during the reset period of the pixel, the gate voltage of transistor M3/M4 will be a threshold voltage below the drain voltage and transistor M3/M4 operates in the linear mode. During the integration period, the gate voltage of transistors M3 and M4 will further discharge and transistors M3 and M4 will remain in the linear mode. Switch transistors M5 through M8 are designed with high aspect ratios in order to decrease the voltage drop across these switches and therefore retain linear output current characteristics of the photo pixel.

The drain voltage of transistor M3/M4 is pinned to $V_{dd}-\Delta$ via the second generation current conveyer circuit 90 shown in FIG. 4. This current conveyor circuit 90 is composed of a two-stage operational amplifier OA with a Miller compensation capacitor (not shown) operated in a negative feedback mode via transistor M9. The gain bandwidth product of the operational amplifier OA is 50 MHz and DC gain $A_0$ is 80 dB. Due to its negative feedback configuration, the negative terminal of the operational amplifier OA is pinned to $V_{ref}=V_{dd}-\Delta$. The input resistance of the current conveyer 90 is estimated by Equation (10) below, in which $g_{m9}$ is the transconductance of M9.

$$r_{in} = \frac{1}{q_{m9}A_0} \qquad (10)$$

The minimum output current from the photo pixel is 3 μA during the reset interval and the input resistance of the current conveyer circuit 90 is around 10Ω. The input capacitance of the current conveyer circuit 90 consists of 256 gate-to-drain overlap capacitances plus the line capacitance of the metal bus, which is 2.5 mm long. With a total input capacitance of around 100fF, the time constant of the current conveyer circuit 90 is 1ns or operational bandwidth of 1 Grad/s or 159 MHz. The operational amplifier OA further improves the tracking of the input voltage of the current conveyer circuit 90 as the input current is increased. The variations of the input terminal of the current conveyer circuit 90 over 10 μA input range is less than 1 μV.

The noise suppression circuitry of the invention is based on a known memory cell described by Hughes et al. in an article entitled "S³I: the Seamless S²I Switched Current Cell," ISCAS '97, pp. 113-116, June 1997. The current memory cell (CDS) 92 comprises a coarse and a fine sub-memory cell. During the memorization stage of the coarse memory cell, charge injection error dependent on the input current level is introduced. These signal dependent charge injections are memorized in the fine memory cell and subtracted from the coarse memory cell. The final memorized current can replicate the original current with 12 bit accuracy.

The noise suppression of the photo pixel is performed in two steps. Initially, the integrated photo current is memorized in the current memory cell 92 for each Stokes parameter. Then the pixel is reset and the reset photo current is automatically subtracted from the integrated photo current. The final current output is independent of the voltage threshold variations of transistor M3 and M4.

The last part of the processing unit is the digitally controlled analog processing unit 60. In this processing unit 60, the output current from each CDS unit 92 is scaled at each scaling unit 94 by each respective Stokes parameter accordingly to the Stokes equations noted above. The scaling coefficient is represented as a in FIG. 4. Regulated cascaded mirrors are used throughout the processing unit 60 allowing for better computational precision.

Figure 5:
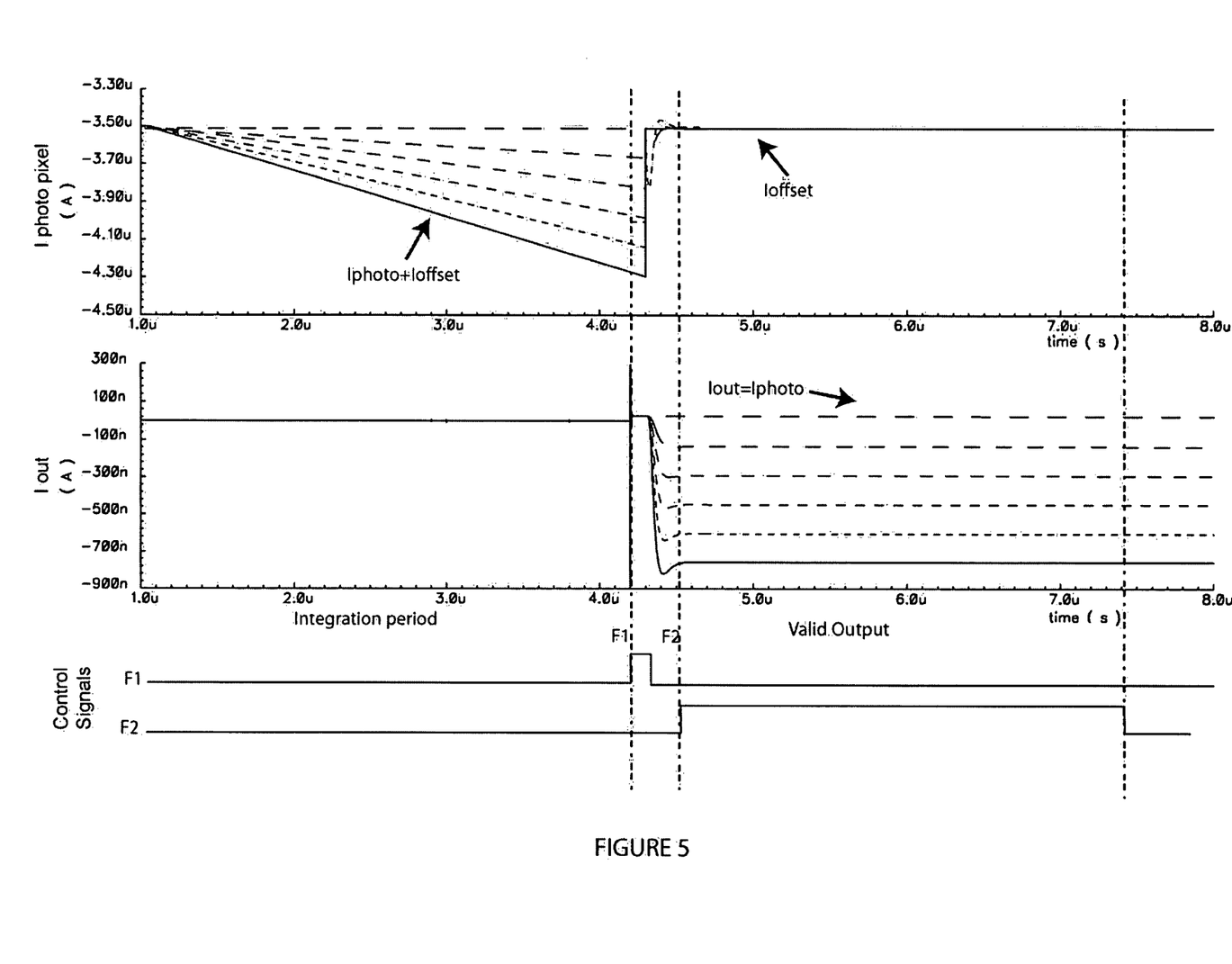
FIG. 5 illustrates simulation results of pixel linear output of photocurrent and noise suppression circuitry for different light intensities.

FIG. 5 illustrates a simulation of the circuit shown in FIG. 4. The top graph illustrates the current output from the pixel (i.e. the drain current from transistor M3). The six dotted lines illustrate current output at different light levels. Hence, for stronger light intensities the discharge loop is larger. At around 4 μsec, the pixel is reset and the reset current level is 3.5 μA. The bottom trace represents the final output of the circuit in FIG. 4. At time F1, the coarse memory cell is sampled and at time F2 the fine memory cell is sampled in the CDS circuit 92. The final output is available after time F2. The different traces represent the final output at different light intensities. From this simulation, it is observed that the CDS circuitry 92 (FIG. 4) operates with 12 bit accuracy.

Micro Fabrication Steps for Thin Film Polarizer Manipulation

Figure 6:
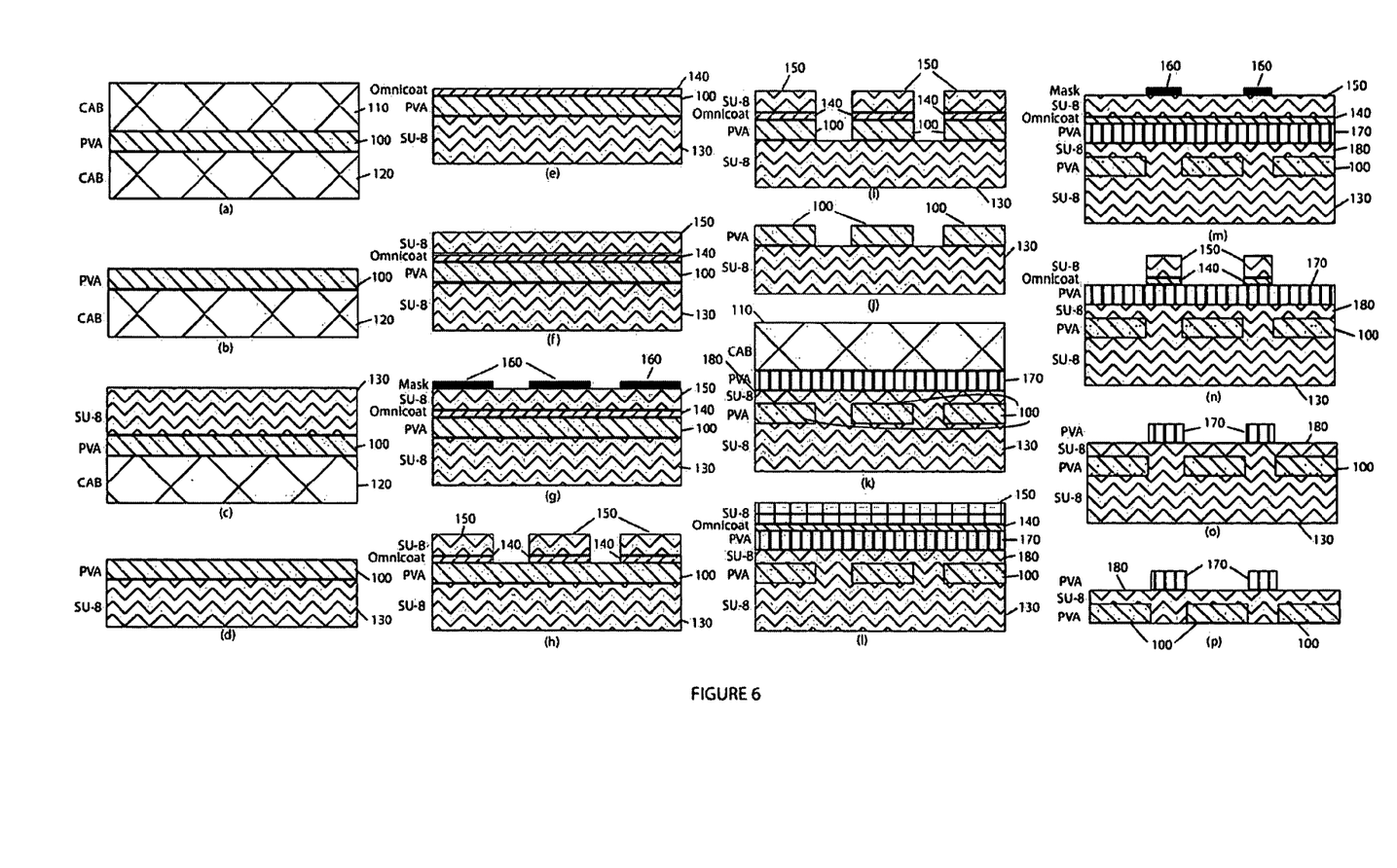

As will now be explained with reference to FIG. 6, a commercially available thin film polarizer is used to create an array of micro-polarizers. As shown in FIG. 6(*a*), the thin film polarizer comprises an iodine-doped Polyvinyl Alcohol (PVA) layer 100, which acts as a dense array of thin microscopic wires. These microscopic wires are formed by mechanically stretching the polymer film, allowing the molecules of the PVA to align in the direction of stretching. The size of the thin microscopic wires has to be 1/10th or smaller of the light's wavelength in order to behave as an effective polarizer. Hence, for blue light wavelengths or 450 nm wavelength, the distance between the microscopic wires should be on the order of 45 nm or less. The mechanically stretching of the polymer creates very good ~10 μm thick polarization filters for the visible spectrum, with extinction ratios of 60 dB in the blue and green spectrum and 40 dB in the red spectrum. As shown in FIG. 6(*a*), the PVA thin film 100 is placed between two 300 μm thick transparent Cellulose Acetate Butyrate (CAB) or polyethylene layers 110, 120. The CAB layers provide structural stability to the fragile and thin PVA layer 100.

In order to be able to manipulate the PVA layer 100, at least one of the protective CAB layers 110, 120 must be removed. Since CAB is a form of acetate, it is therefore acetone soluble. Hence, the sample is submerged in an acetone bath for 30 minutes. One side of the sample is taped with an acetone resistant tape to a glass substrate. The tape provides acetone protection for the bottom CAB layer 120, which is necessary in order to have limited structural stability for the PVA layer 100. The sample is rinsed with de-ionized water (DI) in order to remove the softened CAB layer 110. The DI water also solidifies the CAB layer, upon which the sample is submerged in the acetone bath again. These two steps are repeated several times, until no residual CAB layer remains on the PVA as shown in FIG. 6(*b*).

The bottom CAB layer 120 has two great disadvantages in contrast to its supporting purpose for the PVA layer 100. The high thickness of 300 μm would limit the incident angle of the impeding light wave. If the incident wave comes under a small angle with respect to an axes perpendicular to the PVA layer 100, the wave is filtered by one polarized filter and registered by another photodiode on the sensor. This would create erroneous results in the polarimetric computation. Hence, only waves parallel to the optical axes can be used in such a system, which would limit the field of view of the system. Another more serious problem of the CAB is its etching affinity to the RIE gases. As the PVA thickness tends to vary within a small area, exact timing of the etching procedure can not be determined. If the etching process is prolonged more than necessary, the optical properties of the CAB layer 100 will be strongly degraded. Therefore, the CAB supporting layer 110 is replaced with an SU-8 cross linked, hard baked (developed) photoresist, which is optically transparent and resistant during the etching process of the PVA 100. This is performed by spin coating an SU-8 photoresist 130 on top the PVA, exposing it to an ultraviolet source, developing and hard baking it. One important aspect of the SU-8 is that various thicknesses can be deposited on top of the PVA 100, ranging from submicron until 1 mm thickness, as shown in FIG. 6(*c*).

The next step is to remove the bottom CAB layer 120 in order to be able to pattern the PVA layer 100. This step is similar as the initial step, where a repeated acetone bath and DI water rinsing is used. The final structure after this process is shown in FIG. 6(*d*).

The remaining steps describe the patterning and etching process of the first layer of PVA 100 in accordance with invention. These steps are performed as follows:

(1) Heat the sample to a temperature of 115° C. for 30 minutes. An Omnicoat 140 is applied directly and spin coated at 3000 rpm for 60 seconds. The sample is then baked for 5 minutes at 110° C. The Omnicoat layer 140 helps during the removal stage of the residual SU-8 photoresist 130 once the reactive ion etching (RIE) is completed (see FIG. 6(*e*)).

(2) Immediately apply an SU-8 2015 negative photoresist 150 on top of the PVA 100. The negative photoresist, SU-8 2015, is hydrophobic and it requires the surface of the PVA 100 to be absolutely free of any water molecules. If the sample is cooled to room temperature, water molecules due to room humidity will coat the surface of the PVA 100. The adhesion of the SU-8 150 will be virtually non existent when patterning 14 μm circular structures.

(3) Spin coat the photoresist at 500 rpm for 10 seconds and then at 3000 rpm for 50 seconds with 500 rpm per second acceleration. The thickness of the photoresist is 15 μm.

(4) Bake the sample at 75° C. for 2 min and then at 110° C. for 7 min. Gradual increase of the temperature during the baking process avoids rapid temperature differences and protects the photoresist from cracking (FIG. 6(*f*)).

(5) Expose the photoresist at 375 nm wavelength for 60 seconds at 15 mW intensity. A test mask with 14 micron circular diameters was used. The final mask 160 will contain 10 μm by 10 μm squares. Since it is desired to evaluate adhesion and under etching effects of the PVA 100, a test mask which closely resembles the desired size of the patterns was used (FIG. 6(*g*)).

(6) Post-bake the sample at 75° C. for 2 min and then at 110° C. for 5 min. Gradual increasing and decreasing of temperature during the baking process should be observed for stress purposes.

(7) Develop the photoresist for 3 min in an SU-8 developer and gently rinse it with isopropyl alcohol. If white colored liquid appears on the surface, the photoresist is not completely developed and it is submerged in the developer again (FIG. 6(*h*)).

(8) Next, plasma reactive ion etching is performed on the sample. A mixture of gasses composed of 28 sccm Ar, 30 sccm $O_2$ and 10 sccm $CF_4$ is used. The RF power is 150 W, at 17° C. temperature and 20 mbar pressure. The RIE also affects the top SU-8 photoresist 150 since it is not hard baked (unlike the SU-8 substrate). The etching rate of the PVA 100 is 0.3 μm/min, while the etching rate of the SU-8 is 0.21 μm/min. Since the thickness of the PVA is ~10 μm, the sample is etched for 35 minutes. The minimum thickness for the SU-8 photoresist 150 is 7 μm, but a more conservative approach of 15 μm thickness may be selected to accommodate the variations in the PVA thickness. The RIE provided anisotropic etching with less then 0.5 μm under cutting, compared to 4 μm and 10 μm under cutting with oxygen plasma and wet etching, respectively (FIG. 6(*i*)).

(9) Since there is a residual SU-8 photoresist 150 on top of the PVA microstructures, an SU-8 photoresist remover is used. The sample is submerged in 80° C. bath for 30 minutes in order to remove the photoresist. The Omnicoat layer 150 helps lift the SU-8 photoresist. The final structure of the first PVA layer 100 is shown in FIG. 6(*j*).

The next step is to attach a second layer of PVA 170 and pattern it with the desired mask pattern. A couple of approaches were explored for this step. The most adequate steps are to place a layer of PVA 170 on top of the first layer 100 using SU-8 as an adhesion material. Following the adhesion procedure, the second layer of PVA 170 is patterned. These steps are described below:

(10) Spin coat the photoresist at 500 rpm for 10 seconds and then at 3000 rpm for 50 seconds with 500 rpm per second acceleration on top of the first layer of PVA 100. The thickness of the photoresist is 15 μm. This layer 180 of SU-8 will be used as an adhesion layer between the first (100) and second layer of PVA (170). A layer of SU-8 can also be spin coated on the second layer of PVA 170 in order to provide better adhesion.

(11) Expose the photoresist at 375 nm wavelength for 60 seconds at 15 mW intensity without any masks in order to cross link it. The SU-8 is not pre heated since it will become solid and it will not be able to connect both layers of PVA 100, 170. Clamp both layers of PVA 100, 170 and heat the sample for 20 minutes at 110° C. (FIG. 6(*k*)).

(12) The next steps will involve patterning the top layer of PVA. Repeat steps 1 through 9 and the corresponding steps are depicted in FIG. 6(*l*) through FIG. 6(*o*).

(13) The final step is to remove the bottom layer of SU-8 in order to place the polarization filters as close as possible to the sensor's photodiode. Standard SU-8 procedure was followed. The final product is shown in FIG. 6(*p*).

Reactive Ion Etching Effects on the PVA

Cold plasma or RIE has been widely used to modify or etch polymers. The etching process of polymers is linearly dependent on the concentration of the atomic-oxygen free radicals or on the number of oxygen atoms consumed during the etching process. Since the PVA is an unsaturated polymer, the etching process is represented as an addition to unsaturated moieties. The addition of oxygen to the unsaturated PVA creates a saturated radical with a weakened C—C bond. Any subsequent attack by free oxygen radicals will break the bond, scission the saturated molecule and will create CO and $CO_2$ byproducts (see Equation 11):

(11)

In order to increase the etching rate of the PVA, the concentration of oxygen atoms must be increased. This is achieved with the addition of fluorine gases, such as $CF_4$, $CF_3$, $C_2F_6$, $SF_6$ and others. In an experiment, $CF_4$ was used to enhance the etching rate of the PVA. The enhanced etching rate is due to increased density of electrons, as well as increased energies of electrons in the RIE. At the molecular level, the addition of fluorine atoms will weaken the C=C bond of the PVA molecule and it will create a saturated radical prone to chain scission. The byproducts of this reaction are fluorinated ethane and ethylene derivative.

These stable fluorine products will remain on the surface of the PVA. If the concentration of the fluorine atoms is increased beyond a threshold, fluorinated ethane will have retarding effects on the etching rate due to its byproducts residuals on the surface of the PVA. Hence, the etching rate exhibits a maximum for a given concentration ratio of $O_2$ and $CF_4$ and it rapidly decreases with the increase/decrease of the $CF_4$ concentration.

Figure 7:
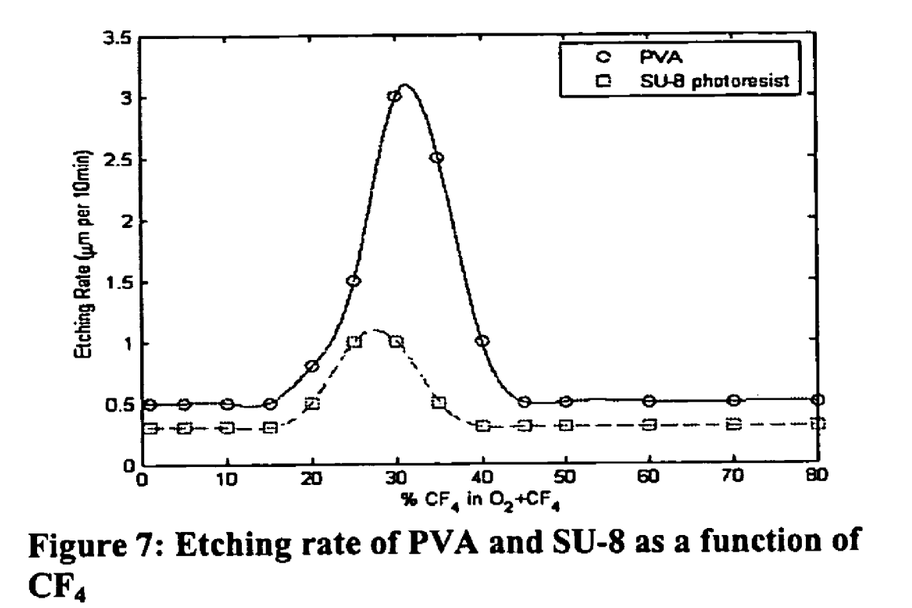
FIG. 7 illustrates the etching rate of PVA and SU-8 as a function of the concentration of $CF_4$.

FIG. 7 illustrates the results of experiments where the concentration of $CF_4$ was varied in order to determine the optimum etching rate. Since the SU-8 is also a polymer, it exhibits similar etching behavior as the PVA. Due to its different molecular structure, the SU-8 has lower etching rate the PVA. This is beneficial as the SU-8 acts as protective layer for the PVA and it should remain until the unprotected PVA is etched completely. From the experimental data, an Oxygen-to-Freon ($CF_4$) ratio of 3:1 yields to optimum etching results.

Experimental Results from the Patterned PVA Thin Film

Figure 8:
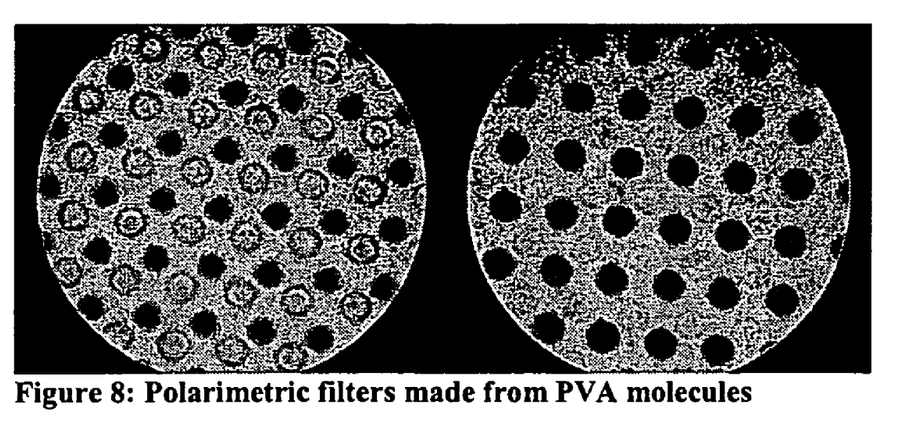
FIG. 8 illustrates the experimental results for a complete sample where the first layer in the right sample attenuates perpendicularly polarized light while the second layer is transparent; the reverse is observed in the left sample.

FIG. 8 presents images of two patterned PVA with 14 micron circular structures in diameter illuminated with polarized light. These two layers are bonded together with an SU-8 as described above. The first layer in the right sample attenuates perpendicular polarized light while the second layer is transparent. The reverse is observed in the left sample. The clear substrate is the SU-8 photoresist. The left sample is illuminated with polarized light parallel to orientation of the PVA molecules in the first layer. The circles in the first layer appear white compared to its background, which is an artifact due the histogram equalization of the digital camera. The circles in the second layer appear opaque and they strongly attenuate the amplitude of the incoming light waves since they are oriented perpendicular to the polarized light orientation. The circles are gray in color due to the iodine doped PVA, while the substrate is transparent due to the optical properties of the SU-8. The right sample is illuminated with cross polarization light. The reverse effect is observed, where the top layer is opaque and the bottom layer is clear. Since the circular structures in both layers reside in different layers and the images were taken under a microscope, the clarity of the circles in both images is different due to microscope artifacts. The under etching of the circular PVA structures, after the RIE process, is measured to be less then 0.5 μm total. Some of the circular structures are slightly deformed due to the irregularities on the mask pattern. This experiment demonstrates that the optical properties of the PVA micro structures are retained. The inventors expect the extension ratios to be similar to un-patterned PVA since the remaining structures in FIG. 8 have been shielded by SU-8 during the RIE process.

Wire-Grid Polarizer

Figure 9:
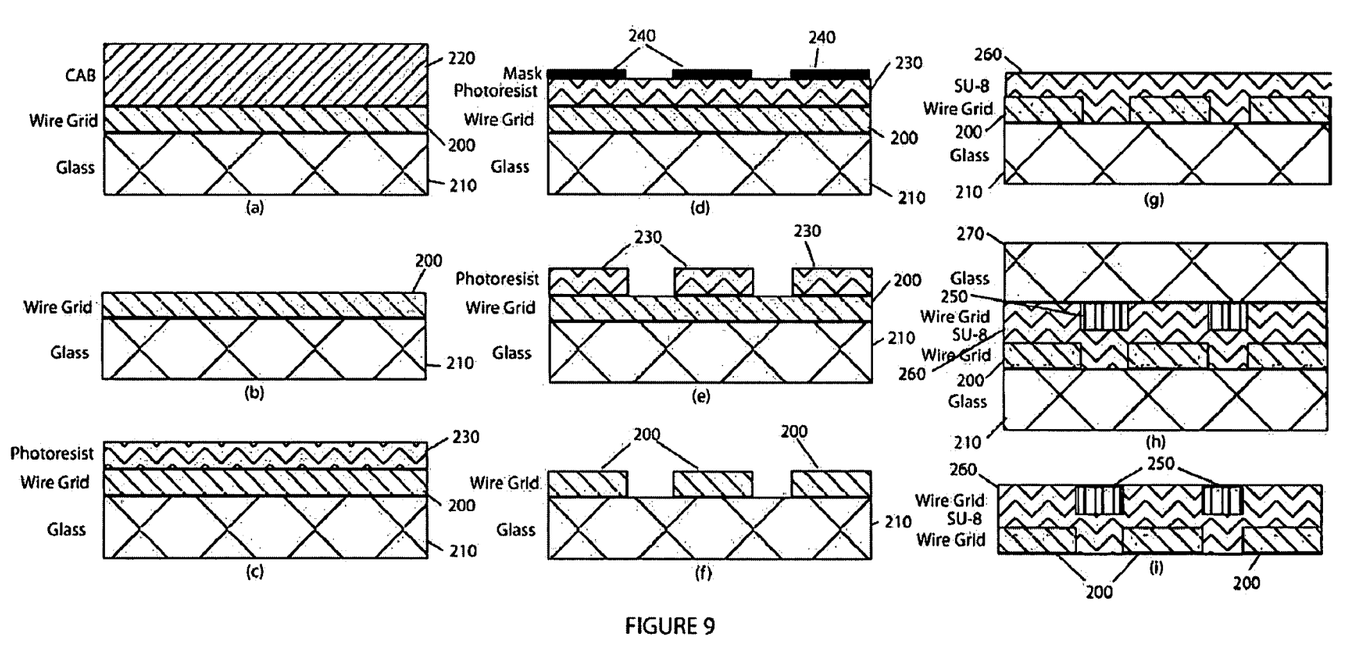

An alternative way to realize a micropolarizer in accordance with the invention is to use an array of closely spaced metallic wires. The electromagnetic wave (i.e. the light) that has an electric field perpendicular to the wires will go through the wire-grid while the wave whose field is parallel to the grid will be reflected. The metal pitch must be of the order of the wavelength and the wire width should be considerably smaller than the wavelength. This implies that advanced lithographic techniques are required to fabricate these wire-grid polarizers. Such wire-grid polarizers are commercially available in which the metal grid is sandwiched between two transparent plates, typically between a glass and plastic plate. These polarizers are uniform across their whole surface. For use as a micropolarizer in accordance with the invention, the inventors etch away part of the metal grid to form a mosaic of small (about 10 μm×10 μm) wire-grid islands corresponding to the dimensions of the pixels. A second wire-grid, rotated by a certain amount (typically 45° or 90°) is etched in a similar fashion and glued on top of the first wire-grid such that the patterns are offset in a checker-board pattern, corresponding to the pattern shown in FIG. 2. A brief description of the steps involved in the etching of the wire-grid polarizers is given below with respect to FIG. 9.

As illustrated in FIG. 9, starting with a wire-grid polarizer including a metal grid 200 sandwiched between a transparent glass plate 210 and a Cellulose Acetate Butyrate (CAB) layer 220, the first step is the removal of the top protective CAB layer 220 which is usually a polymer (FIGS. 9(a) and 9(b)). By immersing the top CAB layer 220 into acetone or another suitable solution one can easily remove this CAB layer 220. This will leave the metallic wire-grid 200 exposed as shown in FIG. 9(b). Using standard lithographic techniques, a mosaic pattern is defined in the metal layer. To do this, a photoresist (positive resist is shown in the figure but a negative resist can be used as well) 230 is first deposited (FIG. 9(c)), and the resulting layers are soft-baked and exposed to UV light using a mask 240 that contains the pattern to be defined on the wire-grid (FIG. 9(d)). After developing the photoresist 230 (FIG. 9(e)), the exposed metal layer 200 is etched using dry etching techniques (FIG. 9(f)). Following etching of the metal layer 200, the photoresist is removed. This process is repeated for the second wire-grid polarizer, but the second wire-grid polarizer 250 is rotated by 45° or 90° (or an appropriate angle) compared to the first wire-grid polarizer 200. In a next step, a thin layer of SU-8 resist (or another suitable material) 260 is deposited on top of the etched wire-grid (FIG. 9(g)). The two wire-grid polarizers are then glued together as shown in (FIG. 9(h)) such that a pattern is formed as shown in FIG. 2. Next, the glass layers 210 and 270 on top and bottom are removed (FIG. 9(i)). This structure can then be aligned and glued on top of the underlying silicon chip.

Another method to form the wire-grid polarizer is to deposit a thin metal film directly on top of the silicon wafer or the chip. This can be done by sputtering, electron-beam evaporation or chemical vapor deposition. A typical metal is aluminum. Using advanced lithographic techniques that allow the definition of very small features, such as electron beam lithography, nano imprint lithography, shadow mark or any other suitable method, the thin metal layers are defined corresponding to the two polarization orientations (e.g. 0° and 45°). A photoresist is deposited on the thin metal layer. Using lithography, one may define the desired pattern in the photoresist. After developing the photoresist, the underlying thin metal layer is etched to realize the finely spaced metal grids on top of the underlying pixels, corresponding to the pattern of FIG. 2.

Algorithmic Computation of the Stokes Parameters

The architectural design of the photo pixel and the addressing circuitry (FIG. 2) allows for block-parallel access of 2 by 2 photo pixels. As shown in FIG. 3, the circuitry shown in FIG. 4 is applied to all four pixels within the window of polarimetric computation. The outputs from all four pixels are connected together in order to complete the computation of the Stokes parameters. The computation of the first three Stokes parameters can be generalized by the following equation (12):

$$S_x = \sum_{i=1}^{4} a_i I_i \text{ for } x = 0 \text{ to } 2 \tag{12}$$

where $S_x$ is the Stokes parameter and $I_i$ and $a_i$ are the photo current and scaling coefficient of the i-th pixel in the 2 by 2 neighborhood. Since there are three identical computational units, all three Stokes parameters are computed in parallel. A noise suppressed intensity image is presented outside the chip as well.

Table I shows the general characteristics of the sensor chip in an embodiment of the invention. The measured precision of the CDS unit 92 is 10 bits and processing bandwidth of ~100 MHz. Another important aspect of the design is the high linearity of the photo pixel due to the high aspect ratios of the switch transistors and high accuracy of the second generation current conveyer. The linearity is very close to the measured results.

TABLE 1

| Chip summary | |
|---|---|
| Technology | 0.18 μm, 6M1P Nwell CMOS |
| No. Transistors | ~800K |
| Array Size | 256 × 256 |
| Pixel Size | 10 μm × 10 μm |
| Chip Size | 3.1 mm × 3.3 mm |
| CDS unit precision (measured) | 10 bits |
| Fill Factor | 75% |
| Processing Circuitry Speed (measured) | 100 MHz |
| Linearity of photo pixel (measured) | >99% |

A sensory architecture for real time polarimetric imaging is described herein. The sensory system includes imaging array, micro polarizer array and processing unit at the focal plane for

What is claimed:

1. A sensor for real-time extraction of polarimetric information at a focal imaging plane, comprising:
an imaging sensor including an array of photo pixels that receive and record intensity values of a target image;
a micropolarizer array mounted between the imaging sensor and said target image, said micropolarizer array comprising no more than two different polarization filters that are offset at approximately a 45 degree angle with respect to each other and arranged to cover respective pixels of said imaging sensor; and
a processing unit that receives two polarization-filtered output signals from said imaging sensor and intensity values from said imaging sensor of recorded intensity values of said target image that have not been polarized by any polarization filter, calculates substantially in real time using said two polarization-filtered output signals and intensity values the polarization state of an electric field vector of light impinging on said focal imaging plane, and scales the polarization-filtered output signals of individual pixels of said imaging sensor based on said polarization state.

2. A sensor as in claim 1, wherein the imaging sensor and the processing unit are formed on the same semiconductor chip.

3. A sensor as in claim 1, wherein each pixel of said imaging sensor comprises a photodiode that receives light impinging on said focal imaging plane and transistors that control the operational mode and access of the photodiode.

4. A sensor as in claim 1, wherein said micropolarizer array comprises first and second iodine-doped polyvinyl alcohol (PVA) layers that are stretched to align molecules of the PVA in the direction of stretching so as to form each of said two different polarization filter orientations.

5. A sensor as in claim 1, wherein said micropolarizer array comprises first and second arrays of closely spaced metallic wire layers arranged to form each of said two different polarization filter orientations.

6. A sensor as in claim 2, wherein said chip further comprises addressing registers for selecting respective pixels of said imaging sensor.

7. A sensor as in claim 6, wherein said micropolarizer array comprises first and second polarization filters having different polarization orientations, said first and second polarization filters being arranged in patterns over said pixels to permit block parallel access of at least 3 pixels of said pixel array of said imaging sensor using said addressing registers.

8. A sensor as in claim 7, wherein said at least 3 pixels comprises a 2×2 pixel neighborhood of said micropolarizer array, each 2×2 pixel neighborhood comprising said first polarization filter at a first polarization angle covering a first pixel of said imaging sensor and said second polarization filter at a second polarization angle to said first polarization filter and covering a second pixel of said imaging sensor, whereby third and fourth pixels of said 2×2 pixel neighborhood of said pixel array of said imaging sensor have no polarization filter thereover.

9. A sensor as in claim 8, wherein outputs of each pixel in said 2×2 pixel neighborhood of said pixel array of said imaging sensor are connected together to complete computation of the first three Stokes parameters by the processing unit using the following equation:

$$S_x = \sum_{i=1}^{4} a_i I_i \text{ for } x = 0 \text{ to } 2$$

where $S_x$ is a Stokes parameter, $I_i$ is a photo current output by a pixel of said imaging sensor, and $a_i$ is a scaling coefficient of an i-th pixel in the 2×2 pixel neighborhood.

10. A sensor as in claim 3, wherein said transistors comprise reset transistors that allow individual pixels to be reset sequentially.

11. A sensor as in claim 10, wherein said transistors comprise linear transconductance amplifiers that convert an output of said photodiode into two output currents and addressing transistors that individually address said output currents on respective busses of said array of photo pixels.

12. A sensor as in claim 11, wherein a current output of each pixel of said imaging sensor is fed into a circuit comprising a current conveyor circuit and a current memory.

13. A sensor as in claim 12, wherein said current conveyer circuit includes an operational amplifier that is operated in a negative feedback mode.

14. A sensor as in claim 12, wherein each current memory stores an integrated photo current provided from said photodiode via said current conveyor circuit.

15. A sensor as in claim 14, wherein a current output of said current memory is provided to a scaling unit of said processing unit where said current output is scaled by a scaling coefficient according to the Stokes equations as determined by said processing unit.

* * * * *

UNITED STATES PATENT AND TRADEMARK OFFICE
CERTIFICATE OF CORRECTION

PATENT NO. : 7,582,857 B2  Page 1 of 1
APPLICATION NO. : 11/406993
DATED : September 1, 2009
INVENTOR(S) : Viktor Gruev, Jan Van der Spiegel and Nader Engheta

It is certified that error appears in the above-identified patent and that said Letters Patent is hereby corrected as shown below:

In the Specifications

Column 7,
Line 6, delete "Ins" and insert -- 1 ns --.
Line 35, delete "a" and insert -- α --.

Column 9,
Line 33, delete "0.21 μm/min." and insert -- 0.2 μm/min. --.

Column 10,
Lines 24-30, delete "

" and insert -- -- .

Signed and Sealed this
Twenty-fifth Day of February, 2014

Michelle K. Lee
*Deputy Director of the United States Patent and Trademark Office*